(12) United States Patent
Tomlinson et al.

(10) Patent No.: US 6,693,148 B2
(45) Date of Patent: Feb. 17, 2004

(54) HUMIDITY SENSITIVE COMPOSITION

(75) Inventors: David John Tomlinson, Chatswood (AU); Wayne John Linklater, Marcoola (AU)

(73) Assignee: Puro-Systems PTY LTD (AU)

( * ) Notice: Subject to any disclaimer, the term of this patent is extended or adjusted under 35 U.S.C. 154(b) by 0 days.

(21) Appl. No.: 10/257,114

(22) PCT Filed: Apr. 12, 2001

(86) PCT No.: PCT/AU01/00425

§ 371 (c)(1), (2), (4) Date: Oct. 8, 2002

(87) PCT Pub. No.: WO01/79341

PCT Pub. Date: Oct. 25, 2001

(65) Prior Publication Data

US 2003/0149157 A1 Aug. 7, 2003

(51) Int. Cl.$^7$ ................................................. C08F 20/02
(52) U.S. Cl. ........................ 524/556; 524/557; 524/576; 524/80; 428/35.4; 27/11; 523/102
(58) Field of Search ................................ 524/557, 576, 524/80, 556; 428/35.4; 27/11; 523/102

(56) References Cited

U.S. PATENT DOCUMENTS 4,151,630 A * 5/1979 Havey ............................. 27/2

FOREIGN PATENT DOCUMENTS

| EP | 530438 A1 | * | 3/1993 | ........... A61L/15/00 |
| GB | 2341866 A | * | 3/2000 | ........... A01G/1/00 |

* cited by examiner

Primary Examiner—David W. Wu
Assistant Examiner—Satya Sastri
(74) Attorney, Agent, or Firm—Connolly Bove Lodge & Hutz LLP

(57) ABSTRACT

A humidity responsive control device consists of a package having at least one face that is a permeable to liquid and gases and water vapor and is formed by mixing together a) 5 to 50% by weight of a hygroscopic polyacrylate and/or PVA polymer, b) 10 to 60% of porous silica minerals such as vermiculite and perlite, c) 5 to 50% of an absorbent such as zeolite or activated carbon for small molecules such as ammonia and d) 5 to 60% by weight of an aqueous emulsion of a mixture of an active ingredient of one or more of a bacteriocidal, fungicidal or odor masking compounds. The device is effective at eliminating and masking odors under varying humidity conditions.

10 Claims, No Drawings

HUMIDITY SENSITIVE COMPOSITION

FIELD OF THE INVENTION

This invention relates to moisture control composition responsive to changes in humidity, particularly for use in odour absorbing and releasing media in a variety of applications for removing and masking odours and other volatiles caused by pets, house-hold rubbish, moulds, cigarettes, engine exhaust gases, cooking, human sweat and vegetable and animal decomposition.

BACKGROUND OF THE INVENTION

Conventionally odour control in domestic situations has been by masking with air fresheners or by cleaning of soiled surfaces to remove the source of the odour. Absorption of malodourous liquids has also had some success.

Typical of this approach is the invention of U.S. Pat. No. 5,819,688 which discloses a mat of a cellulosic fibres bound with an acrylic latex and containing a zeolite mineral. The mat is claimed to be capable of being air dried and reused. A problem is that odours are released from the pad under drying conditions or if the pad is saturated.

U.S. Pat. No. 5,891,221 discloses an odour filtration device utilising hollow wicking fibres impregnated with a permanganate and carbonate or phosphate solution. This is placed in an air stream to remove gaseous odours. The solution flows through the fibres which are placed within a filter through which the air stream flows. This is a large scale system unsuitable for a wide variety of domestic and industrial odour problems.

U.S. Pat. No. 5,944,873 discloses a gas mask incorporating a noxious gas absorber utilising activated carbon, wherein the absorbed gas displaces an odorant as an alarm signal.

Another industrial scale system is disclosed in U.S. Pat. No. 5,236,878 discloses an odour absorbent consisting of a zeolite impregnated with a catalyst component. The adsorbed materials are desorbed by heating to regenerate the absorbent. It is an object of this invention to provide a liquid, volatiles and odour absorbing device that is effective and convenient to use.

BRIEF DESCRIPTION OF THE INVENTION

To this end the present invention provides a package having at last one porous surface, and preferably being used for an absorbent device for liquid and gaseous contaminants, said package incorporating a particulate mixture formed by mixing together
  a) 5 to 50% by weight of a water and/or water vapour absorbing agent
  b) 10 to 60% of a water vapour absorbing and releasing agent
  c) 5 to 50% of an absorbent for small molecules and/or
  d) 5 to 60% by weight of an emulsion or solution of a mixture of odour masking and neutralising compounds impregnated in the particulate components and/or
  e) up to 10% by weight of a water vapour activated active ingredient.

Surprisingly this device absorbs liquid and gaseous wastes in humid and dry atmosphere conditions and releases the odour masking and neutralising compounds. This effect may be due to synergistic interaction of the surfaces of the particulate blend in facilitating the absorption of water vapour and odour compounds and the release of water vapour and actives. This invention is partly predicated on the realization that water vapour has a significant influence on the release, carriage in air and perception, of gas or vapour phase molecules many of which are responsible for malodours. It appears that under higher relative humidity absorption of volatiles and malodorous compounds is improved and under lower relative humidity release of the odour masking compounds is enhanced. This invention finds application in any situation where humidity varies and absorption and/or release of gas or vapour phase molecules is required. The water vapour control provided by this invention is superior to that provided by silica gel and the quantity required is of the order of 10% of the weight of silica gel needed in similar applications. Thus the composition of this invention can be used in packaging electrical and electronic devices and in situations where humidity can affect the performance of machinery such as the paper feeding mechanisms in printers and photocopiers.

In particular this invention is applicable to control of odours which are generated by microbial activity and decomposition and are carried by vapours; including pet trays, nappies, room and cupboard deodorisers, coffins, caskets, cadaver bags and mausoleums, air conditioning systems, food storage and transport containers, industrial plants with volatile and gaseous materials, waste disposal containers and rubbish bins.

The present invention also lowers microbial activity of bacteria and fungi usually associated with absorbed wastes. This is apparently influenced by the reduction in available water and water vapour which in air is defined as relative humidity and this lowering of relative humidity in the air space around the device is an important condition for retarding bacterial and fungal growth. Bacterial and fungal activity is also inhibited by contact with the active compounds on the active surfaces of the absorbents and in the air space about them and on the open surfaces of putrescent materials. Thus the device of this invention is useful in slowing the growth of fungi particuarly moulds or bacteria. In tropical, humid locations moulds other fungi and even algae proliferate in closed systems like cupboards or boats. The device of this invention allows boats and cupboards to be closed and locked without encouraging wood rot, moulds and algal slimes. The water or water vapour absorbing agent is preferably a hygroscopic polymer capable of absorbing water or water vapour in large multiples of its mass which may be described as super absorbancy. A preferred class of super absorbent polymers are polyacrylate/polyalcohol copolymers such as that marketed by Cryovac which are capable of absorbing water up to 400 times their own mass. Optionally other hygroscopic substances such as calcium chloride may be included. Where the application is only to control odours in confined spaces the content of the polymer may be 5 to 20% by weight but where liquid waste is also to be dealt with the content is usually from 15 to 60% by weight.

The agent for absorbing and releasing water vapour is preferably a porous siliceous component which is preferably silicon dioxide, perlite [a dehydrated, exfoliated glassy siliceous material] and/or vermiculite [a hydrated silicate clay or montmorillonite]. These are selected on the basis of their high porosity, very large available surface area and high capillary lift. Capillary lift increases increasing surface area to volume ratio of the particles. This invention is partly predicated on the discovery that the siliceous material such as perlite interacts with the hygroscopic polymer to improve the sensitivity of the absorbent blend to changes in humidity.

It appears to increase the affinity of the polymer for water and facilitates the mass flow of water vapour and volatiles into or out of the polymer.

The molecular absorbent consists of an oxygen scavenger and/or finely divided zeolite preferably clinoptilolilite, mordenite, attapulgite and/or activated carbon. The oxygen scavenger is used in situations where the oxygen present is to be removed permanently. A preferred oxygen scavenger is marketed by Cryovac in Australia under the tradename Everfresh. The Zeolite or activated carbon will absorb oxygen but is likely to release it again if the balance is not maintained. The molecular absorbent is preferably chosen for its ability to absorb nitrogen compounds such as ammonia, amines, cationic compounds and salts thereof. These compounds are the usual consequence of decomposition. However in particular applications such as controlling sulfur compounds, the molecular absorbent will be selected for its ability to absorb sulfur containing gases and vapours. Again high porosity, chemistry, binding efficacy, particle size and large available surface area are important characteristics.

For all the particulate components particle size and surface area affect performance. For the molecular absorbent in flow through applications increasing its particle size reduced the restriction of air flow through the sachet without affecting and reducing its capacity and affinity to absorb volatiles and odour molecules. For the porous siliceous component increasing the surface area increases the capillary lift and the rate at which the actives in the emulsion or solution are released.

The gas binding capability of the molecular absorbent is unexpectedly more effective under humid conditions and higher temperatures. It is thought that this may be because many of the odour molecules are associated with water vapour molecules and the silica and hygroscopic polymer in reducing the relative humidity around the device improves the absorption of the gases responsible for unwanted odours.

The mean particle size for each of the particulate components as well as the particle size distribution affect the performance of the pads. This may be adjusted by simple trialling for each application. In some applications the relative sizes of each of the 3 particulate components can also effect performance and again this can be determined by comparative trials.

The emulsion or solution contains as an active agent one or more of an algicidal, bacteriocidal, fungicidal, insecticidal, or odour masking or neutralising compounds. These may include a mixture of compounds selected from available terpene type compounds such as camphor, menthol, pine, eucalypt and ti-tree oils, terpenoids, compounds of essential oils including phenyl propanoids, aromatic alcohols, sulfur compounds and small molecular weight substituted isoprenes or other volatile compounds. The term terpene compounds as used in this specification includes odorants both synthetic and natural composed of terpenes [$C_{10}H_{16}$] sesqui terpenes, diterpenes and higher polymers and also oxygen containing compounds derived from terpene hydrocarbons such as alcohols, ketones and camphors.

The solution or emulsion of odour masking or neutralising compounds is preferably formed from pure water but may also be an oil or alcohol solution. Where an oil or other non aqueous solvent is used for the actives care must be taken to ensure that it does not inhibit the water vapour exchange function of the particulates. Oils such as safflower oil have been found to be suitable. Most odour masking or neutralising compounds are oil soluble rather than water soluble and may need to be emulsified with a suitable emulsifier that maintains the suspension of fine oil droplets in the aqueous phase of the emulsion. As some odour masking or neutralising compounds have some solubility in water a detergent may also be used to lower the surface tension of the aqueous constituents. This component may also include perfumes. The emulsion or solution includes from 0.01% by weight of active compounds and up to 60% by weight of emulsifiers, detergents or other surface active agents. The emulsion or solution may be formed from a concentrate comprising at least 0.5% of actives which is diluted by adding water to achieve dilution rates of 1/5 to 1/50. This diluted emulsion or solution is generally added at the rate of 10 to 70% by weight of the dry particulate components. It is preferred to add the emulsion or solution as the last component in forming the mixture which returns to a free flowing particulate mix or powder. The content of the active ingredient in the final particulate mixture is at least 0.006% by weight. The choice of the active ingredient has to take into account its susceptibility to be absorbed and released from the absorptive components. Care needs to be taken that the small molecule absorbing agents do not affect the release of the volatile actives. Because of the water absorption capability of the absorbents the odour masking or neutralising compounds are displaced into the vapour phase when the humidity is low effectively masking or neutralising any odours present. When humidity and/or temperature is higher the odours are absorbed together with the wafer vapour in the air around the device.

As well as odour masking or neutralising compounds the device of this invention can optionally include other active agents having biocidaql properties to control, insects, arthropods, arachnids, bacteria, fungi, algae or deodorising properties, or perfume properties or allergy lowering properties. These may include short chain aliphatic alcohols, low molecular weight organic acids including sorbic, citric and benzoic acids, urea, dimethyl sulfoxide, or metabisulfite for sulfur dioxide generation. Tea extracts, tannic acid compounds or thiocyanates may be used as lo an additional component where allergies from dust mites are a problem. Again allergenic activity is also related to humidity and the absorbent system of this invention acts as an effective delivery system. Inorganic salts or polyols may also be included to depress the freezing point of the emulsion where needed. Where the pads are used in conjunction with foodstuffs the actives are selected from approved food additives and adjuvants.

Where the actives are water vapour activated as in the case of metabisulfite it is not essential to add any aqueous phase.

Conveniently the device of the present invention is a package containing the absorbents in finely divided form. At least one portion of the surface of the package is porous to allow the easy transmission of gases, water and other vapours and liquids. Depending on the application the package may be a two sided bag or sachet or be contained in a rigid cassette or having one side impervious. Where the pad is to be applied in contact with a horizontal surface, it is preferable to have one side as an impermeable laminate sheet, to which double sided adhesive tape can be conveniently applied and which will not be limited in adhesion by the emulsified liquid.

Where the pads are intended to absorb large amounts of fluids or water, such pads will have a higher proportion of the hygroscopic polymer [polyacrylate/polyalcohol copolymer] and will be useful as for example absorbents in nappies, for incontinence and for pet litter trays etc.

In other applications both sides can be pervious to gases, volatiles and liquids. These are useful in air-flow impact applications such as air conditioning in vehicles or buildings. In air conditioning applications the molecular absorbent will be in higher concentrations. It has also been found that in flow through applications larger particle sizes for the particulate components is more appropriate to facilitate the passage of the air through the pads.

The preferred pervious material is a non woven fabric with a pore size capable of retaining the smallest absorbent particles after mixing. The material used for tea bags is suitable as the pervious material. Where an impervious backing sheet is required any material including laminates, capable of being easily adhered or heat sealed to the pervious sheet may be utilised. A food grade impervious laminate sheet has been used in the present invention and is suitable for lining the base of pet litter trays.

In forming the mixture it is usually convenient to mix the three particulate components and then add the solution or emulsion. The addition of the solution improves the handling of the mixture during mixing and packaging as it binds the finer particles and prevents their loss.

In use the pads are usually disposed porous face downwards at the top of the space to be treated. However when used in cassettes for air conditioning ducts or in electrical or battery generated heat activated odour releasing devices they may be inserted vertically. In air conditioning ducts, cassettes of filters of multiple pads should be placed obliquely across the air flow.

The pads singly or in sheets, mats or filters can be used in a wide range of applications including odour control in rooms, cupboards, dishwashers, refrigerators, air conditioning, rubbish bins, food transport containers, for moisture control in transport containers etc, electronic boards, photocopier paper trays for volatiles and moisture control in art conservation, applications involving compressed or pumped air & in the storage and of climacteric & other fruit and control of microbiological & biological organisms and/or gases & other volatiles for food transport and storage.

DETAILED DESCRIPTION OF THE INVENTION

Various forms of the invention will be described in the following examples.

The polymer used in the following examples is Stockhausen AP85-38 a non hazardous white stable polyacrylate/polyalcohol copolymer. It is insoluble in water but is capable of absorbing up to 400 times its mass in water.

The Perlite used is available as Fernz P 200 an expanded white natural mineral stable from −25° C. to 100° C. The density is within the range 45–75 Kg/m$^3$ It has a high surface area and high porosity and capillary lift of 13 mm/min @ 5 minutes and a water and oil absorption capacity of about 60% by volume.

The zeolite used in the following examples was obtained from Castle Mountain Zeolites in Quirindi. It is a fine pink powder and has a an $SiO_2$: $Al_2O_3$ ratio of 5.7, a surface area of 28–39 m$^2$/g and ammonia gas absorbency of up to 500 meq/100 g. Its functionality is to absorb gases such as methane, ammonia, hydrogen sulfide and ammoniacal compounds such as amines, urea derivatives and ammonium salts and cations such as sodium, calcium, magnesium, iron, zinc, copper.

The emulsion used in the following examples was formed by diluting a concentrate of an odour neutralizing complex marketed under the brand OCS-24 by Odour Control Solutions P/L of Narellan NSW Australia. The complex may be used in an oil carrier or as a water based emulsion. Surprisingly this complex is effective when used in the present invention in the reduction of the effect of volatile pollutants such as reduced thiols and mercaptans. The complex is composed of 22 essential oils of high purity and has the following approximate composition by volume:

| | |
|---|---|
| Natural and extracted essential oils including terpenes, isoprenoid, phenylpropanoid, mercaptan compounds | 0.875% |
| Chemically derived essential oils structurally equivalent to natural oils | 11.275% |
| Synthetic oils | 3.6% |
| Natural perfume oils | 12.8% |
| Perfume ingredients | 28.95% |
| Other compounds [surfactants] | 5.3% |
| Amphoteric emulsification agent | 50% |

The composition is effective as a biocide against *S. aureus*, *E. coli*, *Ps. aeruginosa*, *A. niger* and *C. albicans*. as measured by the sterility test of the USP. Unless otherwise stated the concentrate was diluted 1/10 with pure water.

Manufacturing Technique

The dry ingredients are mixed to ensure an even distribution of particle sizes and then blended with the emulsion so that the ingredients were still free flowing and not aggregating. In forming the mixture it is usually convenient to mix the three particulate components and then add the solution or emulsion. The addition of the solution improves the handling of the mixture during mixing and packaging as it binds the finer particles and prevents their loss. Care is required to ensure that the bulk density of the perlite is consistent when batching. The admixture of the emulsion is controlled by its interaction with the perlite.

When the liquid is added to the to the combined dry ingredients 1. the mixing vessel & any storage container used prior to, during & subsequent to manufacture must be covered with a well fitting air-tight lid to prevent loss of volatiles;
2. manufacturing must occur in an air conditioned room that is both dehumidified & cooled to reduce the possibility of moisture ingress into the mixture, given its propensity &capacity to sequester moisture from air & release of volatiles;
3. bulk pads when manufactured must be stored flat & not too high one on top of the other, so that only minimal, light pressure is applied to prevent squeezing out of the liquid;
4. Ensure that there is no stratification of particle sizes before the pads are filled.

Pad Behaviour

The mass of the pads made according to the formulations of this invention will vary over time due to changes in humidity. Absolute Humidity determines pad mass with a linear increase in weight with increasing humidity.

Increasing temperature at a low relative humidity [RH] [~20%] increased mass at first and then decreased mass. This seems to be the sum of three effects namely time rate of change of mass, Absolute humidity [mass of water in the air] and dehydration due to rising temperature.

Increasing temperature at constant high RH [~90%] increased equilibrium mass in an exponential manner.

Increasing RH at constant temperature gave a modest increase in pad mass. At higher temperatures this effect was more marked but below 20° C. there was little effect. Above 30° C. and high RH a 5° C. increase in temperature would add about 1 gram in weight to a pad whose initial weight was 2.4 grams.

The speed of moisture uptake increased with increasing amounts of the capillary lift agent [preferably perlite]. Speed of uptake measured as time rate of change of pad mass increased with increasing surface area for the same mass of capillary lift agent.

Increasing the proportion of the super absorbent polymer increased the magnitude of mass change in the pad.

The mass of the pads will cycle over a 24 hour period and 2.4 gram pads have exhibited mass varying from 1.7 grams to 3.5 grams in waste bins and from 1.9 to 10 grams in dishwashers. Generally the pads will lose mass during the day with higher temperatures and lower RH and gain mass at night with lower temperatures and higher RH and dew point is generally an indication of the largest mass.

At constant conditions such as air conditioned rooms at a constant 18° C. and 50% RH a 2.4 gram pad in a bin was 1.8 grams while in a hot house at 37° C. and >80% RH the mass stabilised at 3.5 grams.

Under tropical conditions the minimum mass of the pads gradually increased over several days. The cycling amplitude becomes slightly damped over time. The daily cycling behaviour of the pads is very variable depending on the temperature and RH in the immediate vicinity of the pad.

The effective control of malodours is affected by the binding capacity of the molecular adsorbent [preferably zeolite]. When all the binding sites are filled the pad releases odours back into the environment. Odour control is improved by the inclusion of a (micro)biocide in the active ingredients along with odour masking compounds. It is believed that when the pads are absorbing moisture they are also binding associated vapour phase odour molecules and when they are releasing moisture they are preferentially releasing vapour phase actives such as (micro)biocides or odour masking compounds.

The pads of this invention are particularly suitable for battery powered or cassettes for use in electrically heated odour control devices. Pads of this invention when subjected to resistance heating in such devices quickly lose mass and when the devices are switched off they regain mass.

EXAMPLE 1

An absorbent mix was made using the following ingredients as % by weight of the dry ingredients.

| polyacrylate/polyalcohol copolymer | 10 |
| Perlite | 60 |
| Zeolite | 30 |
| Odour masking/neutralising emulsion | 60 |

The material was then packaged into sachets having one impermeable face of a food grade laminate sheet supplied by Cryovac Australia P/L to which a double sided adhesive tape is applied and a permeable face of nonwoven cellulose and polypropylene paper sold by Dexter Corporation. It has excellent wet strength and is heat sealable with the impermeable laminate.

About 1 gram of the absorbent in a 55×55 mm sachet were used for tidy bins while about 2–2.2 grams in a 75 mm×75 mm sachet were used for larger rubbish bins or in bins in industrial work areas where there were styrene residues. For large bins multiple sachets are used. The sachets are adhered to the underside of the lids of the bins using the double sided adhesive tape and have been functional for 7 to days 14 days when they needed to be replaced.

EXAMPLE 2

An absorbent mix was made using the following ingredients as % by weight of the dry ingredients.

| polyacrylate/polyalcohol copolymer | 10 |
| Perlite | 40 |
| Zeolite | 50 |
| Odour masking/neutralising emulsion | 60 |

Approximately 1.4 grams of this mix was placed in a 55×55 mm sachets of the type described in example 1. These sachets were used in bins for soiled nappies by attachment to the underside of the lid using a double sided adhesive tape as in example 1 and reduced odours and maintained low bacterial levels for at least 7 days.

2–2.2 grams in 75×75 mm sachets were suitable for use in cupboards, wardrobes and refrigerators with the porous surface facing down or on the top shelf, to reduce odours. In refrigerators these sachets needed to be replaced every 14–21 days and in cupboards &wardrobes they last up to 42 days.

Four pads of this formulation were effective for over a week when placed in custom made holders in open grid storm water drains in removing the odour of methane from an underground parking lot built on reclaimed swamp land.

EXAMPLE 3

An absorbent mix was made using the following ingredients as % by weight of the dry ingredients.

| polyacrylate/polyalcohol copolymer | 60 |
| Perlite | 15 |
| Zeolite | 25 |
| Odour masking/neutralising emulsion | 20 |

This mixture was prepared and packaged as in example 1. The sachets were 75×75 mm and contained about 2.5 grams of the absorbent. These were used in dish washers to reduce odour and remained effective for 7–14 days. By increasing the emulsion to 60% the useful life was extended up to 6 weeks depending on use.

Sachets of this formulation but with 2 pervious sides were effective in moisture removal in air intakes into vacuum pumps, thus reducing galvanic corrosion & improved pump life and the functionality of air curtains.

EXAMPLE 4

An absorbent mix was made using the following ingredients as % by weight of the dry ingredients.

| polyacrylate/polyalcohol copolymer | 20 |
| Perlite | 40 |
| Zeolite | 40 |
| Odour masking/neutralising emulsion | 60 |

This mixture was prepared and packaged as in example 1. About 2–2.2 grams was disposed in sachets 75×75 mm and were useful in removing odours in clothes driers and shoes.

In driers these sachets were effective for up to 6 weeks and in shoes depending on conditions the sachets were effective for up to 3 months.

Sachets of this composition were effective in reducing residual volatiles & associated odour in commercial dry cleaning machines during down time such as overnight.

10 grams in sachets 200×150 mm were used in grease traps to remove mal-odours. These pads were also useful to reduce odours from seafood processing. 7 grams of a variation of this blend which only contained 10 parts of the emulsion was used in 200×150 mm sachets in sea food transport containers to reduce mal-odours & contamination of seafood aboard ship.

In all cases better results have been obtained using multiple [3–5] smaller pads [approx. 2 grams ea.].

EXAMPLE 5

An absorbent mix was made using the following ingredients as % by weight of the dry ingredients.

| | |
|---|---|
| polyacrylate/polyalcohol copolymer | 10 |
| Perlite | 60 |
| Zeolite | 30 |
| Odour masking/neutralising emulsion | 30 |

This mixture was prepared and packaged as in example 1 except that the sachets were completely pervious with no impermeable sheet.

2.2 grams in 75×75 mm sachets were useful for reducing odours in domestic or industrial vacuum cleaners. A pair of these sachets that covered the released air outlet were even more effective. In this application a larger particle size for the zeolite gave effective air flow without inhibiting the odour removal. These pads were still effective after a week of continuous use.

Under tropical conditions 2×2–2.2 g 75×75 mm sachets were effective in deodourizing holiday villas during cleaning and retained this functionality for up to 6 hours in intermittent or continual use.

200×150 mm sachets containing 7.5 grams of this blend were placed adjacent the filter in a range hood to reduce odours. A multiple set of the 2 g 75×75 mm pads covering the mesh pad of the range hood were more effective.

Pads of this formulation at air outlets of exhausts prevented the re-ingress of cooking fumes in commercial kitchens & at air inlets to the cabins of agricultural machinery reduced levels of ingress of agricultural chemicals.

12.5 grams of variation of this formulation containing 60 parts of the emulsion were placed in 200×150 mm sachets and the sachets placed in the filter system of an air conditioning system to reduce malodours.

EXAMPLE 6

An absorbent mix was made using the following ingredients as % by weight of the dry ingredients.

| | |
|---|---|
| polyacrylate/polyalcohol copolymer | 10 |
| Perlite | 50 |
| Zeolite | 40 |
| Odour masking/neutralising emulsion | 50 |

This mixture was prepared and packaged as in example 1 except that the sachets were completely pervious as in example 5.

This composition is tailored for use in air conditioning and air vents in vehicles. Having a single sachet on the return air outlet was optimal but an even spread of the mixture across the lumen improved functionality.

Similarly pads of this formulation and presentation removed volatiles, from diesel exhausts in the filling of compressed air cylinders, hooker apparatus, and improved air quality in pumped air applications such as aquaculture, aquariums, and fish tanks.

EXAMPLE 7

An absorbent mix was made using the following ingredients as % by weight of the dry ingredients.

| | |
|---|---|
| polyacrylate/polyalcohol copolymer | 33 |
| Perlite | 33 |
| Zeolite | 33 |
| Odour masking/neutralising emulsion | 20 |

This mixture was prepared and packaged as in example 1.

50 grams of this blend in a suitably sized mat of sachets was used as a liner for a pet litter tray. Again a multiplicity of smaller pads to cover the tray gave superior performance. Increasing the emulsion to 60% increased the odour control and the useful life of the mat. Under a substantial layer of kitty litter changed daily the litter liner of this invention was effective for over 1 month.

EXAMPLE 8

An absorbent mix was made using the following ingredients as % by weight of the dry ingredients.

| | |
|---|---|
| polyacrylate/polyalcohol copolymer | 10 |
| Perlite | 40 |
| Zeolite | 50 |
| Odour masking/neutralising emulsion | 30 |

This mixture was prepared and packaged as in example 1.

2–2.5 grams of this blend in 75×75 mm sachets were useful as deodorizers above a pet litter tray or attached to the ceiling of the enclosure for the tray. In conjunction with the liner of example 7. This was effective for at least a month and in its absence for about 7–10 days.

EXAMPLE 9

The composition of this invention are particularly useful in controlling potentially explosive gases and malodorous volatiles in the storage of human and animal cadavers in coffins body bags and caskets particularly in in above ground interrment in mausoleums. Combined with hermetically sealed and evacuated inert polymer containers they provide total containment systems which may also include a separate & additional pressure discharge valve.

The following description provides examples of applying the composition to different portions of the containment vessel to give an overall solution to a complex problem. The following describes an effective solution to the control of management of the decomposition of an 80 Kg cadaver.

a) Floor Absorbent

The floor absorbent or mattress is made up of two layers of mats of pads heat annealed one to the other on the floor of the containment vessel. Usually this is covered by a lining material under the cadaver.

The base layer is predominantly for absorption of liquid generated from the dcomposition of the cadaver & is a mat composed of between 25 and 110 (75 mm×75 mm) sachets with 2 permeable faces of nonwoven cellulose and polypropylene paper sold by Dexter Corporation, 5 sachets across each of approx. 6 g of the following composition.

| | |
|---|---|
| polyacrylate/polyalcohol copolymer | 96 |
| Perlite | 2 |
| Zeolite | 2 |
| Odour masking/neutralising emulsion | 20 [1/5 dilution in pure water] |

The upper layer is predominantly for binding and deodorisation of decomposition of the cadaver & the effective filtering of these moities from the water so as to increase the binding capacity of the base layer. It is a mat of the same dimensions & pad configuration as the base layer but with an individual unit mass of 4–5 grams & the following composition

| | |
|---|---|
| polyacrylate/polyalcohol copolymer | 20 |
| Perlite | 10 |
| Zeolite | 70 |
| Odour masking/neutralising emulsion | 50 [1/5 dilution in pure water] |

In the early stages of decomposition, this layer can generate mass flow of water and cycling to changes in ambient temperature.

EXAMPLE 9b

Lid Absorbent

The lid absorbent is also made up of 2 layers of mats of pads heat annealed one to the other and attached to the lid of the containment vessel by double sided adhesive tape. Usually this is enclosed within a lining layer attached to the lid so that it is above the cadaver when the lid is closed.

The upper layer is predominantly for absorption of volatiles including low molecular weight gases and other malodorous voltiles generated during decomposition. It is a mat composed of between 25 and 110 (75 mm×75 mm) sachets with 2 permeable faces of nonwoven cellulose and polypropylene paper sold by Dexter Corporation, 5 sachets across each of approx. 6 g of the following composition.

| | |
|---|---|
| polyacrylate/polyalcohol copolymer | 2 |
| Perlite | 2 |
| Zeolite | 96 |
| Odour masking/neutralising emulsion | 10 [1/5 dilution in pure water] |

The lower layer is predominantly for binding and deodourization of decomposition molecules & their disproportionation & chemical neutralisation within an aqueous environment. It is a mat of individual sachets, each of approx 4–5 grams of the same width pad configuration and packaging as the upper layer but some 20 ie 4 rows of 5 pads longer to provide an extended flap which is folded down before the containment vessel is sealed and extends over the pressure reduction valve, if one is installed, to act as a final malodour filter. The lower layer has the following composition:

| | |
|---|---|
| polyacrylate/polyalcohol copolymer | 20 |
| Perlite | 10 |
| Zeolite | 70 |
| Odour masking/neutralising emulsion | 50 [1/5 dilution in pure water] |

Pads or mats of this composition are sensitive to changes in humidity. Limited trial data indicate that they are effective in the deodorisation inside the containment device as measured by hydrogen sulfide odour logger. No detectable or perceptible leakage of malodour from a containment device has been observed in any pressure release of gas through the valve.

EXAMPLE 9c

Pillow

An optional set of absorbents can be placed in a pillow beneath the head of the corpse to provide additional deodorisation as for example in a cadaver of mass greater than 80 kg.

An absorbent mix was made using the following ingredients by weight % of the dry ingredients.

Composition

| | |
|---|---|
| polyacrylate/polyalcohol copolymer | 20 |
| Perlite | 40 |
| Zeolite | 40 |
| Odour masking/neutralising emulsion | 50 [1/10 dilution in pure water] |

The pillow was filled with 50 individual sachts each approx. 2.2 grams with 2 pervious sides and covered with a white pillow slip.

The presence of the absorbents of examples 9 a–c retards the pace of decay within the coffin, binds the liquid decay products and also binds a majority of the gaseous decay products. The initial evacuation reduces the available oxygen and the binding of possible reactive gases ensures that this can be avoided. Because the malodours from coffins are usually worse in humid conditions the unique combination of absorbents is effective in lowering the relative humidity within the coffin and this allows the release of the odour masking or neutralising emulsion in preference to the malodour gases.

EXAMPLE 10

An absorbent mix was made using the following ingredients as % by weight of the dry ingredients.

| | |
|---|---|
| polyacrylate/polyalcohol copolymer | 20 |
| Perlite | 60 |
| Zeolite | 20 |
| Odour masking/neutralising emulsion | 10 |

This mixture was prepared and packaged as in example 1.

7 grams of this blend used in large 200×150 mm sachets were used in fruit and vegetable boxes. Mats made of smaller 75×75 mm pads were more effective. It was also found that using 40–60% of a more dilute [1/50] emulsion also improved odour control with durians.

Table 1 sets out a number of applications with suitable formulations utilising a 10% emulsion which is diluted as indicated and then added in the amount shown. The formulations are all prepared into 2 gram, 75×75 mm pads.

The table includes a column for additional active agents.

TABLE 1

| Application | Super absorbent polymer | perlite | zeolite | Emulsion | Emulsion dilution | Additional active |
|---|---|---|---|---|---|---|
| Container rain | 40 | 50 | 10 | 50 | 1/10 | — |
| Electronic boards & components | 30–40 | 50–40 | 10 | 40 | 1/10 | |
| Printers, Photocopiers, Paper feeders | 35 | 50 | 15 | 40–50 | 1/10 | |
| Air conditioner | 20 | 39 | 40 | 60 | 1/10 | 1 part Calcium Chloride |
| Allergen reduction | 15 | 40 | 43 | 50 | 1/20 | 2 parts Thio-cyanate |
| Fish processing | 15 | 50 | 35 | 60 | 1/10 | — |
| Book preservation | 50 | 25 | 25 | 60 | 1/10 | — |
| Dry rot in boats | 50 | 35 | 14 | 60 | 1/10 | 1 part Sorbate |
| Industrial scrubbers | 10 | 50 | 40 | 60 | 1/10 | 10 zeolite can be replaced with 10 Activated carbon |
| Incontinence pads | 20 | 8 | 20 | 30 | 1/50 | 2 Citric acid & 50 floc |
| Volatile chemicals | 10 | 50 | 40 | 40 | 1/10 | Some zeolite can be replaced with activated carbon |
| Air pollutants | 10 | 50 | 39 | 40 | 1/10 | 1 part Salt |
| Seafood carton | 20 | 50 | 30 | 30 | 1/50 | |
| Tropical fruit carton | 10 | 40 | 50 | 30 | 1/50 | |
| Apple/pear carton | 10 | 30 | 60 | 50 | 1/50 | |
| Berry carton | 10 | 40 | 50 | 50 | 1/50 | |
| Cherry carton | 25 | 50 | 40 | 50 | 1/50 | |
| Citrus carton | 10 | 50 | 30 | 50 | 1/50 | |
| Onion bag | 20 | 50 | 30 | 50 | 1/50 | |
| Oven pad for baked mutton | 10 | 50 | 40 | 40 | 1/50 | |

From the above examples and description it can be seen that the present invention provides a cost effective and convenient means of controlling humidity induced problems from keeping electronic components dry, to inhibiting microbial growth, to treating unwanted odours in mausoleums.

Variations and modifications may be made to the formulations within the frame work of the component types and concentration ranges described.

What is claimed is:

1. A package having at last one porous surface, said package incorporating a particulate mixture formed by mixing together:
    a) 5 to 50% by weight of a water and/or water vapor absorbing agent;
    b) 10 to 60% of a water vapor absorbing and releasing agent selected from perlite or vermiculite;
    c) 5 to 50% of an absorbent for small molecules and/or;
    d) 5 to 60% by weight of an emulsion or solution of a mixture of odor masking compounds impregnated in the particulate components; and/or
    e) up to 10% by weight of a water vapor activated active ingredient.

2. A package as claimed in claim 1, for use with liquid waste control wherein component a) is a hygroscopic polymer present in amounts of 15 to 50% by weight.

3. A package as claimed in claim 2, wherein component b) is present in amounts of 10 to 30% by weight.

4. A package as claimed in claim 1, for odor control wherein component a) is a hygroscopic polymer present in amounts of 5 to 15% by weight.

5. A package as claimed in claim 4, wherein component b) is present in amounts of 20 to 60% by weight.

6. A humidity sensitive device having at last one porous surface, said device incorporating a finely divided particulate absorbent formed by mixing together:
    a) 5 to 50% by weight of a hygroscopic polymer able to absorb multiples of its dry mass in water;
    b) 10 to 60% of perlite or vermiculite; and
    c) 15 to 50% of a zeolite.

7. A humidity sensitive device as claimed in claim 6, which additionally includes 5 to 60% by weight of an emulsion or solution containing at least 0.01% by weight of at least one active compound selected from algicidal, bactericidal, fungicidal, insecticidal or odor masking or neutralizing compounds.

8. A composition of matter consisting of:
    a) 5 to 50% by weight of a water and/or water vapor absorbing agent capable of absorbing multiples of its own weight in water;

b) 10 to 60% of a water vapor absorbing and releasing agent selected from finely divided perlite or vermiculite;

c) 5 to 50% of a finely divided absorbent for small molecules; and d) and up to 10% of an active ingredient.

9. A composition of matter consisting of:

a) 5 to 50% by weight of a polyacrylate/polyalcohol co-polymer;

b) 10 to 60% of finely divided perlite or vermiculite;

c) 15 to 50% of a finely divided zeolite or activated carbon; and d) up to 10% of an active ingredient selected from one or more or an algicidal, bactericidal, fungicidal, insecticidal or odor masking or neutralizmg compounds.

10. A cadaver container having distributed within it, in several positions, compositions as defined in claim 8, or claim 9.

* * * * *